United States Patent [19]
Claassen

[11] Patent Number: 4,579,577
[45] Date of Patent: Apr. 1, 1986

[54] VACUUM PRESS MOLD CONSTRUCTION

[75] Inventor: George R. Claassen, New Kensington, Pa.

[73] Assignee: PPG Industries, Inc., Pittsburgh, Pa.

[21] Appl. No.: 685,012

[22] Filed: Dec. 21, 1984

[51] Int. Cl.⁴ .......................................... C03B 23/035
[52] U.S. Cl. ...................................... 65/273; 65/106; 65/287; 294/65
[58] Field of Search .............. 65/106, 273, 287, 182.2; 294/65

[56] References Cited

U.S. PATENT DOCUMENTS

| | | | |
|---|---|---|---|
| 3,634,059 | 1/1972 | Miller | 65/275 |
| 4,052,185 | 10/1977 | Kolakowski | 65/106 |
| 4,052,188 | 10/1977 | Seymour | 65/273 |
| 4,187,095 | 2/1980 | Frank | 65/104 |
| 4,210,435 | 4/1979 | Claassen | 65/106 |
| 4,260,409 | 4/1981 | Reese et al. | 65/273 |
| 4,274,858 | 6/1981 | Claassen et al. | 65/273 |
| 4,277,276 | 7/1981 | Kellar et al. | 65/106 |
| 4,319,907 | 3/1982 | Pike | 65/106 |
| 4,349,375 | 9/1982 | Kellar et al. | 65/291 |
| 4,357,156 | 11/1982 | Seymour | 65/104 |
| 4,430,110 | 2/1984 | Frank et al. | 65/273 X |

Primary Examiner—Arthur Kellogg
Attorney, Agent, or Firm—Andrew C. Siminerio

[57] ABSTRACT

A vacuum mold for shaping hot glass sheets having a rigid back plate, a flexible perforated lower shaping wall, adjustable spacers positioned between the back plate and shaping wall and easily removable side wall members that seal the vacuum chamber and allow easy access to the internal adjustable spacers. The peripheral edge portions of a refractory cloth which covers the mold is coated with heat resistant silicone rubber to seal the vacuum chamber of the mold.

20 Claims, 3 Drawing Figures

VACUUM PRESS MOLD CONSTRUCTION

FIELD OF INVENTION

This invention relates to the shaping of heat deformable material, such as heated glass sheets and, more particularly, to a novel vacuum press.

BACKGROUND OF THE INVENTION

Shaped and tempered glass sheets are widely used as side windows or rear windows in vehicles such as automobiles or the like, and, to be suitable for such application, flat glass sheets must be shaped to precisely defined curvatures dictated by the shape and outline of the frames defining the window openings into which the glass side or rear windows are installed. It is also important that the rear or side windows meet stringent optical requirements and that the windows be free of optical defects that would tend to interfere with the clear viewing therethrough in the viewing area. Any distortion in shaping members that engages a heat softened sheet to help shape the latter is replicated in the major surface of the sheet and may result in an optically deficient surface of the shaped sheet.

One type of commercial production of shaped glass sheets for such purposes commonly includes heating flat glass sheets to their softening point, shaping the heated sheets to a desired curvature and then cooling the bent glass sheets in a controlled manner to a temperature below the annealing range of the glass. During such treatment, a glass sheet is conveyed along a substantially horizontal path that extends through a tunnel-type furnace where the glass sheet is one of a series of sheets that are heated to a deformation temperature of glass and along an extension of the path into a shaping station where each glass sheet, in turn, is engaged by a vacuum mold. The vacuum mold lifts and holds the heat softened glass sheet by suction. At about the same time, a transfer and tempering ring having an outline shape conforming to that desired for the glass sheet, slightly inboard of its perimeter moves upstream into a position below the vacuum mold. The vacuum releases and deposits the glass sheet onto the tempering ring. The tempering ring supports the peripheral edge of the glass sheet while it conveys the glass sheet into a cooling station for rapid cooling.

The vacuum mold is provided with a curved shaping surface that shapes the heat softened glass sheet by suction thereagainst. The molds are generally constructed of a ceramic block or a metal vacuum box. Apertures in the block or the metal shaping plate of the vacuum box connect to a hollow vacuum chamber which communicates with a vacuum source. The mold is covered with a refractory material such as a fiber glass cloth that will not mar or harm the glass at elevated temperatures.

It would be advantageous to construct a vacuum mold with an adjustable shaping surface that can easily change the shaping curvature of the mold without having to replace or disassemble the vacuum mold.

DESCRIPTION OF PATENTS OF INTEREST

U.S. Pat. Nos. 4,052,188 to Seymour; 4,210,435 to Claassen; 4,274,858 to Claassen et al.; 4,319,907 to Pike; and 4,052,185 to Kolakowski disclose bending molds for vertical press bending. The press faces are metal plates covered with a flexible heat-insulating material that will not harm the glass sheet at elevated temperatures. Adjusting bolts are interposed between the shaping surface and a rigid metal backplate used to reinforce the mold face. There is no vacuum engagement by the pressed faced.

U.S. Pat. Nos. 4,260,409 to Reese et al., and 3,634,059 to Miller disclose the use of a solid ceramic press face for shaping the hot glass sheets in a horizontal press-bending apparatus. The ceramic press face is fixed to a rigid baseplate. Due to the nature of the press face, its shaping surface cannot be adjusted or modified to change its curvature other than reshaping the ceramic face. A different ceramic press face is required to form a different glass sheet configuration. In U.S. Pat. No. 3,634,059, apertures are drilled through the ceramic mold to provide airways to a central portion of the mold.

U.S. Pat. Nos. 4,357,156 to Seymour and 4,187,095 to Frank disclose vacuum lifting and shaping apparatuses using a metal box type arrangement. In Seymour, the lifting device is a vacuum platen comprised of a hollow chamber having a flat apertured bottom plate. The hollow interior of the platen is connected to a vacuum source. In Frank, the vacuum lifting device shapes the glass sheet. The vacuum mold is composed of a metal box with a refractory material such as fiber glass covering the apertured shaping surface. Neither patent provides for a way to adjust the configuration of the shaping surface of the vacuum device.

U.S. Pat. Nos. 4,349,375 and 4,277,276 to Kellar et al. teach the shaping of heat softened glass sheets by engaging them against the apertured surface of a deformable vacuum mold and deforming the vacuum mold while maintaining the glass sheet in vacuum engagement thereagainst. The edges of the vacuum chamber are sealed by a hollow metal bar along its non-deforming edge and flexible, longitudinal metal slats or solid neoprene bars along its deformable edge. There are no provisions for internal adjustment of the curvature of the shaping surface. The mold is deformed only by externally positioned pistons or actuating rods.

SUMMARY OF THE INVENTION

The present invention provides for an air tight chamber with easily removable, non-porous, flexible side wall that allows for easy access into the interior of the chamber. A lower wall of the chamber is apertured and a vacuum source is connected to the chamber to permit the lower wall to engage and support a workpiece positioned at the lower wall when a vacuum is drawn through the chamber.

The present invention also provides a vacuum mold for shaping hot glass sheets wherein the mold includes a rigid back plate, a flexible, perforated lower shaping wall, adjustable spacers positioned between the back plate and the shaping wall to maintain them in spaced relation, and easily removable side wall members that seal the vacuum chamber of the mold and allow easy access to the internal adjustable spacers. A fiber glass cloth covers the lower shaping wall. The adjustable spacers include T-shape members rigidly attached to lower shaping wall. A threaded rod is rotatably attached to T-shape member and extends through an aperture in the rigid plate. A first and second nut assembly threaded on the threaded rod captures the adjusting plate therebetween.

In one embodiment of the present invention the removable side walls are the peripheral area of the fiber glass cloth that spans between the rigid plate and shaping wall. This area of the cloth is coated with a heat resistant, impervious material such as heat resistant silicone rubber. The fiber glass cloth which is draped across the shaping wall is secured to the rigid plate by removable clips. To gain access to the adjustable spacers between the rigid plate and shaping wall, the clips are removed, allowing the coated cloth to be pulled back to expose the internal adjustable spacers.

In an additional embodiment of the present invention, a edge of a screen is welded to the periphery of the lower shaping wall with the other edge being detachably secured by clips to the rigid plate, to span the distance therebetween. The screen is coated with a heat resistant, impervious material. A fiber glass cloth is draped across the lower shaping wall and attached to the rigid plate. To gain access to the internal adjustable spacers, the cloth is removed, and the end of the coated screen attached to the rigid plate is unclipped allowing the coated screen to be pulled back to expose the internal adjustable spacers.

DESCRIPTION OF THE PREFERRED EMBODIMENT

Figure 1:
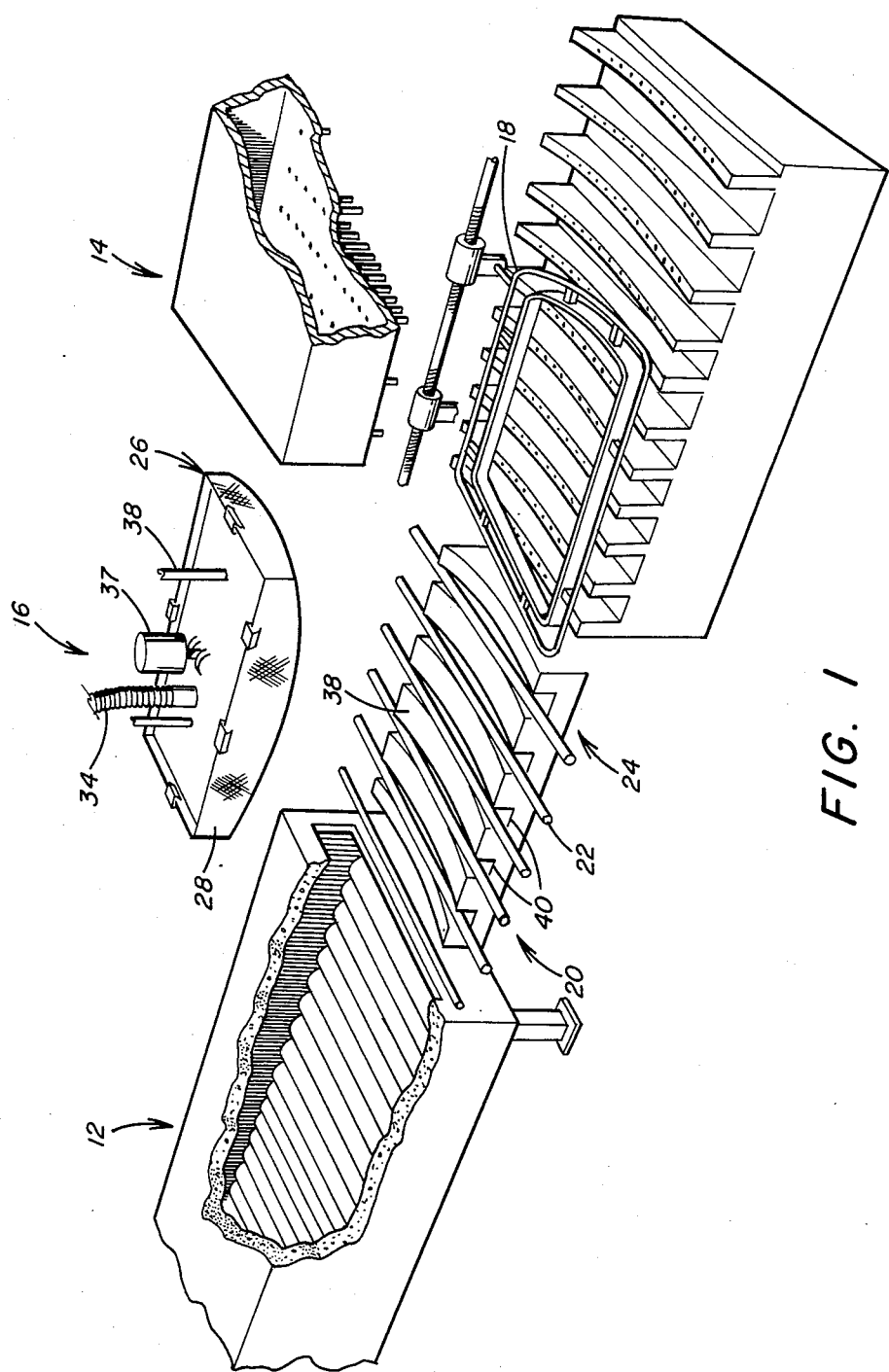
FIG. 1 is a fragmentary partly schematic view looking upstream at a typical glass sheet bending apparatus using the vacuum mold which is the subject of this invention.

Referring to FIG. 1 of the drawings, an apparatus for treating and shaping sheets of heat softenable material, such as glass, includes a furnace 12 through which glass sheets are conveyed from a loading station (not shown) while being heated to a glass deformation temperature. A cooling station 14 for cooling the curved sheets of glass and an unloading station (not shown) beyond the cooling station 14 are located in end to end relation to the right of the furnace 12. An intermediate or shaping station 16 is disposed between the furnace 12 and the cooling station 14. A sheet transfer means 18 located in the cooling station 14 transfers the shaped and tempered glass sheet downstream for transport to the unloading station.

The furnace 12 includes a horizontal conveyor 20 comprised of longitudinally spaced transversely extending conveyor rolls 22 that define a path of travel which extends through the furnace 12 and the shaping station 16. The rolls 22 of the conveyor 20 are arranged in sections and their rotational speed controlled through clutches (not shown) so that the speed of each conveyor section may be controlled and synchronized in any convenient means.

Often time, the curvatures of automobile windows are similar but not identical. As a result, a different bending mold must be used. The amount of time needed to remove an upper mold for one pattern and install a replacement mold for another pattern of a different radius of curvature is considerable and would interfere with the time that could be used in production. Therefore, it is desirable to have an upper shaping mold capable of producing multiple patterns of different curvatures. In addition, it would be advantageous to have the upper and lower molds large enough to accommodate the production of an entire of family of patterns having the same radius of curvature as taught in U.S. Pat. No. 4,187,095, which teachings are hereby incorporated by reference.

Figures 2, 3:
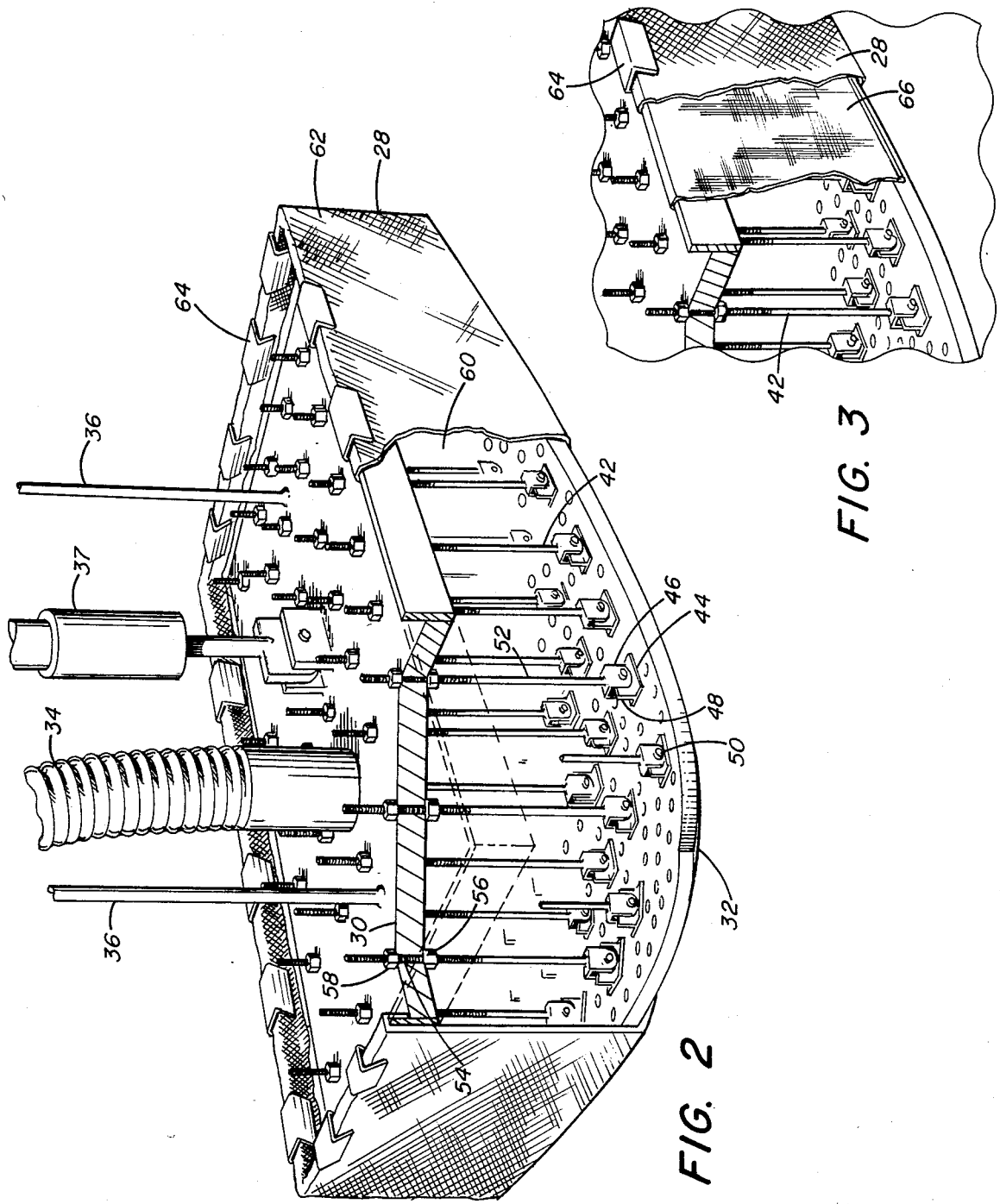
FIG. 2 is a fragmentary perspective view of the vacuum mold, which is the subject of this invention.
FIG. 3 is a fragmentary view of the vacuum mold in FIG. 2 illustrating an additional embodiment of the invention.

The shaping station 16 comprises a lower shaping mold 24 and an upper shaping mold 26, the latter being the subject of this invention. The mold 26 is covered with a refractory cloth cover 28, such as fiber glass, to insulate the glass from the mold 26. The upper vacuum mold 26 has a rigid upper mounting plate 30 and a flexible apertured lower wall 32. The lower wall 32 is shaped to conform with the shape desired for the glass sheet to be shaped. Referring to FIGS. 1 and 2 as required, the upper vacuum mold 26 which communicates with a source of vacuum (not shown) though an evacuation pipe 34 and a suitable valve (not shown) is suitably connected through upper vertical guide rods 36 to a support frame (not shown) and is vertically movable via a piston arrangement 37 relative to the frame. The evacuation pipe 34 may be connected through a suitable valve arrangement to a source of pressurized air (not shown). The valves for the vacuum line and for the pressure line may be synchronized according to a predetermined time cycle in a manner well known in the art. The lower shaping mold 24 comprises an upper surface 38 which generally complement the shape of lower wall 32 of the upper mold 26. The upper surface 38 is interrupted by intermittently transversely extending grooves 40 which provide clearance for raising and lowering the lower shaping mold 24 between a recessed position below the conveyor rolls 22 and an upper position above the level of the conveyor rolls 22.

Referring to FIG. 2, the lower wall 32 of the upper vacuum mold 26 is connected to the upper mounting plate 30 through a plurality of adjustable connectors 42. T-shape member 44 is fixed to the lower wall 32 in any convenient manner. In the preferred embodiment, the member 44 is welded to the lower wall 32. A clevis member 46 is fitted over the stem section 48 of the T-shape member 44 and rotatably secured thereto by a bolt assembly 50 passing through the clevis 46 and the stem section 48. A threaded rod 52 extends from the clevis 46 through a hole 54 in the upper mounting plate 30 and is secured thereto by nuts 56 and 58. By capturing the upper mounting plate 30 between the nuts 56 and 58, the shape of the lower wall 32 is adjusted for shaping glass and firmly secured through the adjustable connectors 42, e.g. as taught in U.S. Pat. No. 4,052,185 which teachings are hereby incorporated by reference.

In order to seal the open edge area between upper mounting plate 30 and lower wall 32 to form a central vacuum chamber 60, a non-porous, high heat resistant material is used. In the preferred embodiment, the peripheral edge portion 62 of the fiber glass cover 28 is used to seal the chamber 60. The fiber glass cover 28 is drawn across the apertured lower wall 32 with end portion 62 spanning between the plate 30 and wall 32 and is removably fastened to the plate 30 by clamps 64 or any other convenient means. The portion 62 is coated with a heat resistant silicone rubber, e.g. Dow Corning 736 Silastic ® RTV, or other heat resistant sealant to prevent airflow therethrough and to form a pliable, vacuum seal. Although not required for the vacuum mold to function, the use of resistant silicone rubber allows the peripheral edge portion 62 to maintain some flexibility. When a vacuum is drawn in the chamber 60 through the evacuating pipe 34, the coated fiber glass cloth seals the space between the plate 30 and the wall 32 so that the air enters the chamber 60 only through the apertured lower wall 32.

To adjust the curvature of the lower wall 32, the rubber impregnate end portion 62 of the fiber glass cover 28 are disconnected from the upper plate 30 and dropped, exposing the internal adjusting connectors 42. With this arrangement, the spacing between the upper mounting plate 30 and the lower wall 32 could be reduced, but still must be large enough to permit the use of suitable adjusting wrenches. The nuts 56 and 58 are loosened and tightened as a pair to increase or decrease the spacing between the upper plate 30 and the lower wall 32.

It has been found that when the shaping station 16 is positioned close to the exit end of the furnace 12, the heat from the furnace 12 tends to breakdown the heat resistant sealant used to coat the portion 62 of the cover 28. To solve this problem, a coated close-weave screen can be used. As shown in FIG. 3 a screen 66 is attached by any convenient means, around the periphery of the lower wall 32 and secured to the upper plate 30 by clamps or other removable means. The screen 66 is then coated with a heat resistant sealant. By removing the clamps, the coated screen can be pulled back to facilitate easy access to the adjustable connectors 42 in the vacuum chamber 60. The uncoated fiber glass cover 28 would cover both the lower wall 32 and the sealant coated screen 66 providing additional protection against the heat from the furnace 12. In practice a coated wire screen, tack welded around the periphery of the lower wall 32 and clamped to the upper plate 32, has been successfully employed to seal the vacuum chamber 60.

As an additional alternative, any heat resistant impervious material, such as heat resistant plastic films can be detachably secured between the upper mounting plate 30 and the lower wall 32 to seal the chamber 60. Metal foils have been successfully used in place of the coated screen 66.

It should be noted that although the specific embodiments of this invention are directed towards a shaping mold for a heat deformable material, such as glass, the teaching of this invention can be applied to any application where a vacuum chamber is used. The form of the invention shown and described in this disclosure represents an illustrative preferred embodiment thereof. It is understood that various changes may be made without the departing from the gist of the invention except insofar as defined the claimed subject matter that follows.

I claim:

1. A vacuum mold for shaping sheets comprising;
   a rigid plate;
   a perforated, flexible shaping wall having a shaping surface capable of being shaped;
   means to space said shaping wall from said rigid plate to maintain said shaping surface of said shaping wall so as to define a desired curvature of said sheet to be shaped, wherein said shaping surface remaining constant throughout a shaping operation and further wherein said spacing means is adjustable such that the distace between said rigid plate and said lower shaping wall can be varied so as to change the curvature of said shaping wall;
   pliable means to seal the space between the peripheral edges of said rigid plate and said shaping wall to form a vacuum chamber therebetween, wherein said pliable sealing means is adjustable over the entire peripheral space between said rigid plate and said shaping wall; and
   means through which a vacuum can be drawn in said chamber.

2. An apparatus as in claim 1 wherein said adjustable spacing means includes a T-shape member rigidly attached to said lower shaping wall, a threaded rod member rotatably attached to said T-shape member and extending through an aperture in said rigid plate and a first and second nut assembly threaded on said threaded rod member capturing said rigid plate therebetween.

3. An apparatus as in claim 1 wherein said pliable sealing means includes a refractory material cloth to cover said shaping wall with edges detachably secured to said rigid plate, said cloth having a peripheral area that spans the space between said rigid plate and said shaping wall and further wherein said peripheral area of said cloth is coated with heat resistant impervious material.

4. An apparatus as in claim 3 wherein said heat resistant impervious material is heat resistant silicone rubber.

5. An apparatus as in claim 3 further including a lifting mold disposed below said lower shaping wall and means adapted to lift said mold, supporting a glass sheet thereon, into close adjacency to said lower shaping wall to enable a vacuum within said chamber applied through the apertures of said lower shaping wall to engage said lifted glass sheet against said shaping surface.

6. An apparatus as in claim 5 wherein said sheet is a hot glass sheet.

7. An apparatus as in claim 1, wherein said pliable sealing means includes a screen with one end attached to said peripheral edge of said shaping wall and another end detachably secured to said rigid plate, said screen being coated with a heat resistant, impervious material.

8. An apparatus as in claim 7 wherein said heat resistant impervious material is heat resistant silicone rubber.

9. An apparatus as in claim 7 further including a lifting mold disposed below said lower shaping wall and means adapted to lift said mold, supporting a glass sheet thereon, into close adjacency to said lower shaping wall to enable a vacuum within said chamber applied through the apertures of said lower shaping wall to engage said lifted glass sheet against said shaping surface.

10. An apparatus as in claim 9 wherein said sheet is a hot glass sheet.

11. An apparatus as in claim 7 wherein said screen is a close mesh wire screen.

12. An apparatus as in claim 1 wherein said pliable sealing means includes a cloth with one end attached to said peripheral edge of said shaping wall and another end detachably secured to said rigid plate, said cloth being coated with a heat resistant impervious material.

13. An apparatus as in claim 12 wherein said cloth is a refractory material cloth.

14. An apparatus as in claim 13 wherein said heat resistant impervious material is heat resistant silicone rubber.

15. A method of sealing an adjustable vacuum mold including a rigid plate, a perforated flexible shaping wall spaced from said rigid plate, and a means to adjustably space said shaping wall from said rigid plate, comprising:
   spanning the space between the peripheral edges of said rigid plate and said shaping wall with a heat resistant material;

coating said material with a heat resistant, impervious sealant so as to form a pliable sealing member.

16. The method as in claim 15 wherein said material is a refractory cloth and said spanning step includes covering said shaping wall with said cloth and detachably securing said cloth to said rigid plate such that peripheral areas of said cloth span said space between said rigid plate and said shaping wall, and said coating step includes coating said peripheral areas of said cloth.

17. The method as in claim 16 wherein said coating material is heat resistant silicone rubber.

18. The method as in claim 15 wherein said material is a wire screen and said spanning step includes attaching an end portion of said screen to the peripheral edge to one of either said rigid plate or said shaping wall and detachably securing another end of said screen to the other of said rigid plate or shaping wall so as to span said space between said rigid plate and shaping wall.

19. The method as in claim 18 wherein said coating material is heat resistant silicone rubber.

20. The method as in claim 15 wherein said spanning and coating steps are interchangeable.

* * * * *